Figure 1:
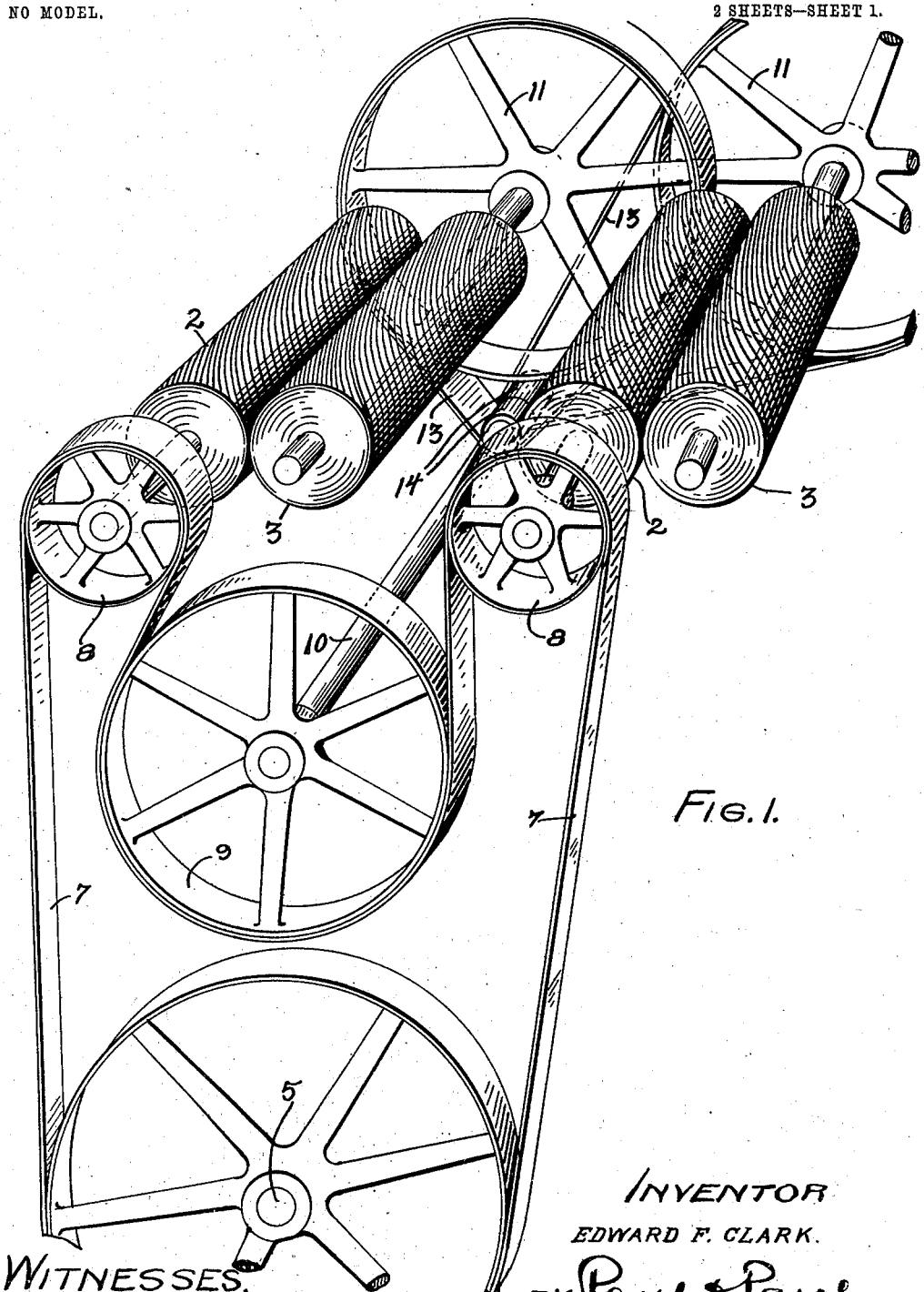

No. 741,887. PATENTED OCT. 20, 1903.
E. F. CLARK.
FLOUR PROCESS AND APPARATUS.
APPLICATION FILED FEB. 11, 1902.
NO MODEL. 2 SHEETS—SHEET 1.

WITNESSES.
E. G. Staude
M. P. Noonan

INVENTOR
EDWARD F. CLARK.
BY Paul & Paul
ATTORNEYS

No. 741,887. PATENTED OCT. 20, 1903.
E. F. CLARK.
FLOUR PROCESS AND APPARATUS.
APPLICATION FILED FEB. 11, 1902.

NO MODEL. 2 SHEETS—SHEET 2.

LINE OF GRINDING CONTACT.

WITNESSES

INVENTOR
EDWARD F. CLARK.
BY Paul & Paul
HIS ATTORNEYS

No. 741,887. Patented October 20, 1903.

UNITED STATES PATENT OFFICE.

EDWARD F. CLARK, OF MINNEAPOLIS, MINNESOTA.

FLOUR PROCESS AND APPARATUS.

SPECIFICATION forming part of Letters Patent No. 741,887, dated October 20, 1903.

Application filed February 11, 1902. Serial No. 93,550. (No model.)

*To all whom it may concern:*

Be it known that I, EDWARD F. CLARK, of Minneapolis, county of Hennepin, State of Minnesota, have invented certain new and useful Improvements in Flour Processes, of which the following is a specification.

My invention relates to improvements in the processes of making flour from wheat or other grain.

In the usual gradual-reduction process for making flour from wheat the wheat is passed successively between corrugated rolls, whereby the wheat-berry is broken, the bran shattered and loosened, and considerable quantities of fine flour are made. Each reduction leaves the constituent portion of the berry broken as little as possible from that of the preceding break or reduction, it being desirable to produce as little fine flour as possible and as large a quantity of middlings. These middlings, after being separated from the bran and fine flour, are finally reduced to flour and constitute what is known as "patent flour." The break-rolls as they are commonly used are cut with either left or right hand spirals, which vary anywhere from one-half ($\frac{1}{2}$) inch to one and one-half ($1\frac{1}{2}$) inches to the length of the roll, with a tendency the past few years to lessen rather than increase the amount of spiral. The differential speeds of the rolls vary also, running from two (2) to two and one-half ($2\frac{1}{2}$) revolutions to one. Two and one-half ($2\frac{1}{2}$) revolutions to one are most commonly used. The number of corrugations to the inch and style of teeth are made to conform to the size and class of stock to be ground. Very small spirals used on rolls, as above stated, bring the corrugations very nearly parallel at the grinding-surface, there being usually just enough spiral to bring the corrugations out of line with each other and prevent hooking. The substantially horizontal position of the corrugations causes the berry to pass between the rolls in the same horizontal position without any influence being exerted by the spirals to tip the berry up into a perpendicular position or move it sidewise as it passes between the rolls. The old style of breaking with small spirals naturally influences the berry to pass through in a horizontal or sidewise position; but if any berries do chance to pass through in a perpendicular or endwise manner the action is to cut them into chunky middlings with the bran as firmly attached to them as it was to the berry before grinding instead of granulating the inside of the berry and at the same time holding the bran intact, as I do by my improved process of breaking. With one-fourth ($\frac{1}{4}$) inch spiral to the foot if the rolls are allowed to come together they will touch each other only once in ten and one-eighth ($10\frac{1}{8}$) inches in the length of the rolls. This gives an uneven action, causing the stock to be cut too much at the point of contact and not enough on the remaining surface of the roll. This is the principal reason why so many reductions are needed. The rolls thus corrugated have a long horizontal contact, which tends to chop or crush the stock too much, abrading the bran, cutting up the germ, and making too much break-flour and small middlings.

With the usual roller process it is necessary to make a large number of reductions on corrugated rolls or breaks to reduce the wheat to middlings. Usually six such breaks are made in large mills and four or five in small mills. Again, in the usual process of making flour from wheat after the middlings have been separated from the bran it is customary to grind these middlings into flour by passing them between smooth rolls or through stones. A large number of these reductions by smooth rolls are necessary, frequently as high as twenty (20) or twenty-two, (22.) This makes a long and complicated process, requiring much power and wearing out and destroying the stock. Again, in the reduction of middlings to flour by smooth rolls and stones where the middlings are obtained from the softer and more starchy berries of wheat it frequently happens that the middlings instead of being ground into flour will be crushed into flakes. When these flakes are made by smooth rolls, it is necessary to beat them up as much as possible on centrifugal reels, scrolls, or beaters; but the greater part of them travel on from one system to another until they find their way into the low-grade or shorts bins. The middlings obtained from the softer and more starchy berries are when properly ground helpful to the color of the flour; but under the ordinary process, as already stated, a considerable portion of these middlings is formed into flakes, and these flakes, many of them, are never converted into first-class patent flour.

The objects of my present invention are, first, to provide an improved process of removing the bran from the wheat-berry in a practically whole condition and granulating the berry, so as to produce the largest possible amount of middlings and little or no flour. By the application of this process to the breaks I reduce the number of reductions and at the same time make larger, better, and a greater quantity of middlings. I also make less break-flour and finish the bran for the packer in a broad, clean, and salable condition.

Second, another object of my invention is to reduce the middlings thus obtained to flour without cutting the particles of bran and germ as much as is done by stones and without forming the flakes which are made on the smooth rolls from the softer and more starchy berries.

Other objects of the invention will appear from the following detailed description, taken in connection with the accompanying drawings, which serve to illustrate means for carrying out my improved process.

Figure 3:
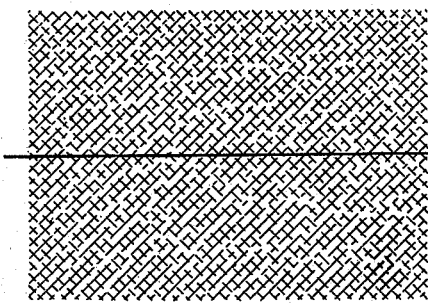
Figure 2:
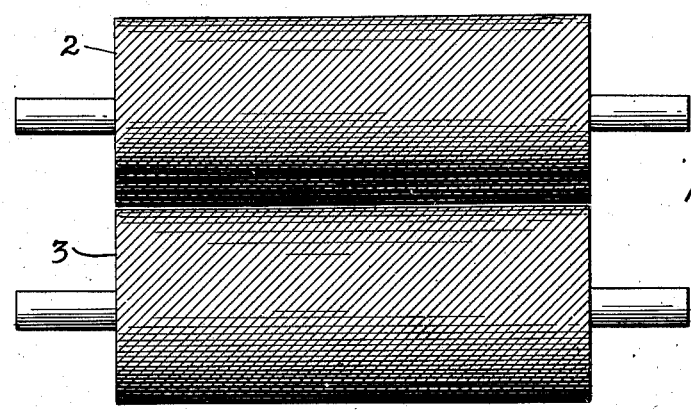
Figure 4:
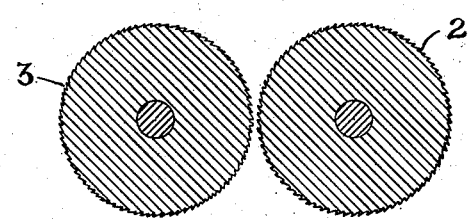

In the drawings, Figure 1 is a perspective view showing the arrangement of a double set of rolls and the drive therefor and illustrating my improved process. Fig. 2 is a plan view of a single set of rolls that may be used for carrying out my invention. Fig. 3 is a diagram illustrating the manner in which the raking action of one set of grinding-points past the other is obtained. Fig. 4 is an end elevation of one pair of rolls.

In carrying out my invention I provide both grinding-rolls with a largely-increased spiral—such, for example, as ten (10) or twelve (12) inches to the foot—with a corresponding increase of the differential speed of the rolls. By this I mean that each corrugation passes ten or twelve inches circumferentially of the roll while passing one foot longitudinally thereof. I am thus enabled to change the character of the grinding contact of the rolls and produce a grinding contact that is formed practically by a series of points, one series of which moves at a high rate of speed with the fast roll and the other of which remains nearly stationary or having a very slow rate of speed with the slow roll. With this construction the slow roll acts as a holder or shaper to the grain. The corrugations are given at the grinding-surface a strong angle, causing the berry to pass through in more of an endwise or perpendicular than a sidewise or horizontal position. The spreading influence of the spiral on this roll is reduced by its very slow speed to the minimum degree. The points of the fast roll with its high rate of speed and maximum spreading influence hit the slowly-moving series of points in the slow roll running in an opposite direction, raking across them in such a manner as to give the berry a rolling or twisting sidewise as well as downward action, practically rolling it over and breaking it across the corrugations of the slow roll and at the same time subjecting it to the raking and spreading action of the fast roll. The number of raking-points in the fast roll passing one point of the slow roll within a given period of time will be equal to the differential of the roll. For example, if I am using fourteen (14) revolutions of the fast roll to one of the slow roll there will be fourteen (14) points on the fast roll raking past one point of the slow roll at the line of grinding contact. This arrangement of rolls will give a perfect granulation, either grinding open or close-with less abrasion to the bran than any other system with which I am acquainted. The great number of points brought to bear on the berry or stock in the manner described causes the middlings to shell out of the bran with the least possible crushing process, practically stripping the bran off from the berry nearly whole, reducing the whole body of the berry to middlings, and driving the bran and germ off with the least possible chopping or cutting action. With this arrangement also the distance between the grinding-points on a horizontal line at the line of grinding contact is less than the size of a berry of wheat, while under the old method the distance between the grinding-points on this line might vary all the way from three and one-half ($3\frac{1}{2}$) inches to ten (10) inches, which is out of all proportion to the size of the grain. By the use of my invention when the grinding-points are near together the berry is held in position and an evenness of granulation is produced which it is not possible to get in breaking in any other way known to me.

In the drawings, 2 2 represent the fast rolls, and 3 3 the slow rolls, of a grinding-mill. Each of these rolls is spirally corrugated, the corrugations running in the same direction around each roll, and hence where the rolls are brought together, which is called the "line of grinding contact," the corrugations cross each other and, as here shown, at nearly right angles. The corrugations run spirally around the rolls, and I prefer to employ a corrugation having a spiral of ten (10) or twelve (12) inches to the foot. This reduces the contacting surfaces on the two rolls to a series of points, one series of points raking past the other as one roll is driven fast and the other slow. I have shown in Fig. 1 the rolls 2 2 arranged to be driven from the shaft 5 by the belt 7, which passes around pulley 8 on the roll-shafts and around the pulley 9 on the counter-shaft 10. Each of the slow rolls 3 is provided with a large driving-pulley 11, and these rolls are driven by the belts 13 from the pulleys 14 on the counter-shaft 10. By this means any differential desired may be obtained. I have here shown and prefer to use a differential of about twenty-six (26) to one, (1.)

With this differential there is a raking action of twenty-six (26) points on the fast roll past a single point on the slow roll.

In Fig. 3 of the drawings I have shown a diagram illustrating the line of grinding contact between the two rolls, and I have represented by dotted lines the two series of corrugations. At the line of grinding contact it will be seen that the corrugations pass each other at substantially right angles and that the corrugations on each roll arranged at this angle form practically a series of points on this line, and as one roll is driven faster than the other one series of points rake past the other, according to the speed of the rolls. If the differential is twenty-six (26) to one, (1,) then twenty-six (26) points on the fast roll rake past a single series of points on the slow roll. The result of this is that the bran is stripped nearly whole from the berries, or, in other words, the berries seem to be twisted out of the bran. The whole body of the berry is reduced to middlings, and the bran and germ are driven off with the least possible chopping or cutting action.

I make use of the same apparatus and process in reducing the middlings to flour, except that I use what is termed "scratch-rolls"—that is, rolls having very fine corrugations—such, for example, as forty-eight (48) or fifty (50) to the inch. These rolls are arranged with substantially the same spiral as the break-rolls, and I use practically the same differential. With this arrangement almost the entire quantity of middlings can be converted into fine flour, giving very much the same grinding action as is obtained by the use of stones, but without cutting the particles of bran and germ as much as is done by stones. By this means also I entirely eliminate the flakes, which with the smooth rolls are made from the softer and more starchy berries of wheat. By my improved process the flakes are converted into first-class patent flour and the long system of rolling the stock over and over and beating up the flakes is done away with. The stones may be dispensed with entirely, and fewer rolls are needed to do the same work.

I claim as my invention and desire to secure by Letters Patent—

1. The process of reducing wheat or other grain, which consists in passing the berries between rolls having spiral corrugations running in the same direction and of a degree of spiral that causes the corrugations upon the contacting surfaces of the rolls to run at substantially right angles to each other, one of said rolls being driven at a slow speed and the other at a high speed, whereby the berries are subjected to the raking action of one series of grinding-points traveling past another series of similar points.

2. The process of reducing the middlings to flour, which consists in passing the granules between rolls having spiral corrugations running in the same direction and of a degree of spiral that causes the corrugations upon the contacting surfaces of the rolls to run at substantially right angles to each other, one of said rolls being driven at a slow speed and the other at a high speed, whereby the granules are subjected to the raking action of one series of grinding-points traveling past another series of similar points, substantially as described.

In witness whereof I have hereunto set my hand this 4th day of February, 1902.

EDWARD F. CLARK.

In presence of—
 A. C. PAUL,
 C. G. HANSON.